United States Patent
Lassalle et al.

(10) Patent No.: US 11,058,208 B2
(45) Date of Patent: Jul. 13, 2021

(54) METHOD FOR SELECTING A COSMETIC PRODUCT FOR AN INTENDED USER

(71) Applicant: CHANEL PARFUMS BEAUTE, Neuilly sur Seine (FR)

(72) Inventors: Astrid Lassalle, Pantin (FR); Sandrine Couderc, Pantin (FR)

(73) Assignee: CHANEL PARFUMS BEAUTE, Neuilly sur Seine (FR)

( * ) Notice: Subject to any disclaimer, the term of this patent is extended or adjusted under 35 U.S.C. 154(b) by 305 days.

(21) Appl. No.: 16/376,312

(22) Filed: Apr. 5, 2019

(65) Prior Publication Data
US 2019/0318505 A1 Oct. 17, 2019

Related U.S. Application Data

(60) Provisional application No. 62/657,269, filed on Apr. 13, 2018.

(51) Int. Cl.
*A45D 44/00* (2006.01)
*G06T 7/90* (2017.01)
(Continued)

(52) U.S. Cl.
CPC ............ *A45D 44/005* (2013.01); *G01J 3/463* (2013.01); *G01J 3/50* (2013.01); *G06K 9/00228* (2013.01);
(Continued)

(58) Field of Classification Search
None
See application file for complete search history.

(56) References Cited

U.S. PATENT DOCUMENTS 7,522,768 B2  4/2009  Bhatti et al.
9,442,973 B1  9/2016  Tuan et al.
(Continued)

FOREIGN PATENT DOCUMENTS

JP  2006-189394 A  7/2006
JP  2008/162939 A  7/2008
(Continued)

OTHER PUBLICATIONS

Yu YH, Lee TT, Kwok NM, Chen PY. Chip-based adaptive skin color detection using trajectory constraints on hue. Visualization in Engineering. Dec. 2014;2(1):1-3. (Year: 2014).*
(Continued)

*Primary Examiner* — Kim Y Vu
*Assistant Examiner* — Nathan J Bloom
(74) *Attorney, Agent, or Firm* — Nixon & Vanderhye

(57) ABSTRACT

Disclosed is a method for selecting a cosmetic product, and a method for image acquisition and image processing for the selection method, including: acquiring an image of a person in a controlled lighting environment, and measuring and recording the colorimetric coordinates of the person's face; processing the image to determine an absolute value of the skin tone; correlating the absolute value with a usage color map established for each of multiple cosmetic products of a database by measuring the color of each cosmetic product under its conditions of use, and to determine a personalized color matrix; extracting, from the database, the cosmetic product(s) whose color measurement is part of the personalized color matrix; using an information medium, presenting the product(s) included in the personalized color matrix; and optionally selecting the preferred product(s) chosen by the person from those that are part of the personalized color matrix.

14 Claims, 3 Drawing Sheets

(51) Int. Cl.
*G01J 3/46* (2006.01)
*G01J 3/50* (2006.01)
*G06K 9/00* (2006.01)
*G06K 9/46* (2006.01)

(52) U.S. Cl.
CPC ..... *G06K 9/00234* (2013.01); *G06K 9/00255* (2013.01); *G06K 9/4652* (2013.01); *G06T 7/90* (2017.01); *A45D 2044/007* (2013.01); *G01J 2003/466* (2013.01); *G06T 2207/10024* (2013.01); *G06T 2207/30201* (2013.01)

(56) References Cited

U.S. PATENT DOCUMENTS

| | | | |
|---|---|---|---|
| 10,028,569 | B2 | 7/2018 | Yamanashi et al. |
| 2003/0062058 | A1 | 4/2003 | Utsugi |
| 2006/0126941 | A1* | 6/2006 | Higaki ............... G06K 9/00201 382/190 |
| 2006/0178904 | A1* | 8/2006 | Aghassian ........... A45D 44/005 705/1.1 |
| 2007/0058858 | A1* | 3/2007 | Harville ............... A45D 44/005 382/165 |
| 2009/0263013 | A1* | 10/2009 | Xiong ................. G06K 9/4652 382/164 |
| 2011/0317917 | A1* | 12/2011 | Free .................. G06K 9/00234 382/167 |
| 2012/0172685 | A1* | 7/2012 | Gilbert ................. A61B 5/411 600/306 |
| 2013/0033590 | A1 | 2/2013 | Yacoob et al. |
| 2013/0271484 | A1* | 10/2013 | Aoki ........................ G06T 11/00 345/593 |
| 2014/0323873 | A1* | 10/2014 | Cummins .............. A61B 5/441 600/473 |
| 2015/0035661 | A1 | 2/2015 | Chen |
| 2016/0156840 | A1* | 6/2016 | Arai ................. H04N 5/232945 348/77 |
| 2017/0178220 | A1 | 6/2017 | Chong et al. |
| 2017/0272741 | A1 | 9/2017 | Maltz et al. |
| 2018/0260871 | A1 | 9/2018 | Harvill et al. |
| 2019/0104980 | A1* | 4/2019 | Farooq .................. A61B 5/444 |
| 2019/0197736 | A1* | 6/2019 | Sugaya .............. G06Q 30/0643 |
| 2019/0203061 | A1 | 7/2019 | Honmura et al. |

FOREIGN PATENT DOCUMENTS

| | | |
|---|---|---|
| JP | 2014-159550 A | 9/2014 |
| KR | 10-2013-0033041 A | 4/2013 |
| WO | 09/839735 A1 | 9/1998 |
| WO | 2008/108760 A1 | 9/2008 |
| WO | 2016/012104 A1 | 1/2016 |

OTHER PUBLICATIONS

Pujol FA, Pujol M, Jimeno-Morenilla A, Pujol MJ. Face detection based on skin color segmentation using fuzzy entropy. Entropy. Jan. 2017;19(1):26. (Year: 2017).*

Kanami Yamagishi et al.: "Cosmetic Features Extraction by a Single Image Makeup Decomposition", p. 1997-1999.

* cited by examiner

METHOD FOR SELECTING A COSMETIC PRODUCT FOR AN INTENDED USER

The present invention relates to a method for selecting a cosmetic product intended for a person, for a personalized recommendation of a product corresponding to his or her needs and preferences. It also includes an image acquisition method and an image processing method implemented in the method for selecting a cosmetic product.

This method applies within the context of customer experience, the goal being to be able to give someone advice in choosing a cosmetic product and more particularly in choosing the color of a cosmetic product having a color and to be applied to the person's skin, based on the actual skin tone of the person and where appropriate taking into account his or her personal preferences.

This method is particularly suitable for providing a recommendation and an aid in choosing a foundation color that matches the skin tone of a person.

Methods are known from the prior art for determining a person's skin tone in order to offer the most suitable product based on skin color and the color of a foundation. However, these methods make use of means which have limitations or are too selective. For example, methods based on measuring a person's skin color by using a spectrophotometer or by capturing images of localized area(s) of the face are well known (U.S. Pat. No. 9,442,973). These methods have two major disadvantages: only specific areas of the face are taken into account, and in addition, in the case of a spectrophotometer, the direct contact of a measurement means in direct contact with the skin may be unacceptable for some people as part of the customer experience.

Also, the perception of the color of any object is dependent on the light that illuminates it and on the parameter settings of the system that records them. To overcome this problem, it is necessary to have means for calibrating the lighting environment in which the object is located, and reference means for transposing the measured values to an environment that is calibrated relative to the reference system.

Image acquisition and means for processing the image in a standardized reference system are therefore elements indispensable to obtain a precise correlation between the measurement of the person's skin color and the measurement of the color of the cosmetic product in the same reference system.

It is also known that the color of cosmetic products may evolve over time. In particular, a cosmetic product within a container such as a bottle, jar, pot, etc. has a perceived color called the "bulk color", and this same cosmetic product spread on a surface in a continuous film (thinner than the cosmetic product within a container) has a perceived color called the "film color" that is different from the bulk color. Generally in the methods of the prior art, only the "bulk color" of the cosmetic product is measured, but the film color is closer to the conditions of use of the cosmetic product, as the product is generally used by taking a small amount from its container then applying it by spreading the cosmetic product on all or part of the face.

It is also known that many cosmetic products may exhibit variations in color during use, which may be due for example to evaporation of the volatile ingredients initially present in the composition of the cosmetic product. This evaporation then generates a change in the initial composition, and may in particular contribute to the "darkening" phenomenon that is well-known in the field of cosmetics.

It is therefore necessary to have effective and accurate reproducible methods, which take into account not only the skin tone parameters of a person, but also correlate them to the color parameters of a cosmetic product under conditions of use.

The present invention aims at meeting this need and overcoming the disadvantages of existing methods.

The invention therefore comprises a method for selecting a cosmetic product intended for a person, for the purpose of providing a person with a personalized recommendation of a cosmetic product, based on the person's skin tone and possibly his or her preferences in terms of makeup effect. The invention also comprises an image acquisition method making use of means for obtaining an accurate measurement of the skin tone in a standardized and reproducible manner.

In a second embodiment, the invention also comprises an image processing method making use of means for correlating the measurement of the person's skin tone with the color of the cosmetic product, said color being previously measured under conditions of use.

In a third advantageous embodiment, the invention comprises the combination of the image acquisition method according to the invention and the image processing method according to the invention, making it possible to deliver to a person a recommendation for the choice of cosmetic product that is consistent with the accurate measurement of the skin tone of said person and the color of said cosmetic product having the closest color measured under conditions of use.

In an alternative mode of this embodiment, the invention optionally comprises an additional step of collecting the person's preferences in terms of shade, color effect, finish, and makeup result expected, in order to integrate them when offering the recommendation.

In a fourth embodiment, the invention comprises a method of determining a usage color map of a cosmetic product.

In a fifth embodiment, the invention comprises a method for determining an absolute value of the skin tone of a person More specifically, the invention is a method for selecting a cosmetic product intended for a person, comprising the steps of:
 having a database comprising information relating to cosmetic products;
 acquiring an image of a person in a controlled lighting environment;
 processing said image by standardized means in order to determine an absolute value of the skin tone of said person;
 measuring the color of the cosmetic products integrated into the database, under their conditions of use, in order to obtain a usage color map;
 correlating said absolute value of the skin tone with said usage color map;
 extracting, from said database, the cosmetic product(s) whose color measurement within the usage color map correlates with the absolute value of the person's skin tone;
 using an electronic medium, presenting to the person the extracted products obtained in the previous step so that he or she can select the cosmetic product of choice from the list of extracted products.

The selection method according to the invention thus enables a person, such as a customer, to have an experience at the point of sale of cosmetic products of his or her choice, which provides said person with advice or a personalized offer in the choice of cosmetic product and more particularly in the choice of a foundation type of product.

DESCRIPTION OF THE DRAWINGS

Other features and advantages of the invention will be apparent from the following detailed description given by way of non-limiting example, with reference to the accompanying drawings, in which.

DETAILED DESCRIPTION OF AN EMBODIMENT OF THE INVENTION

Figure 1:
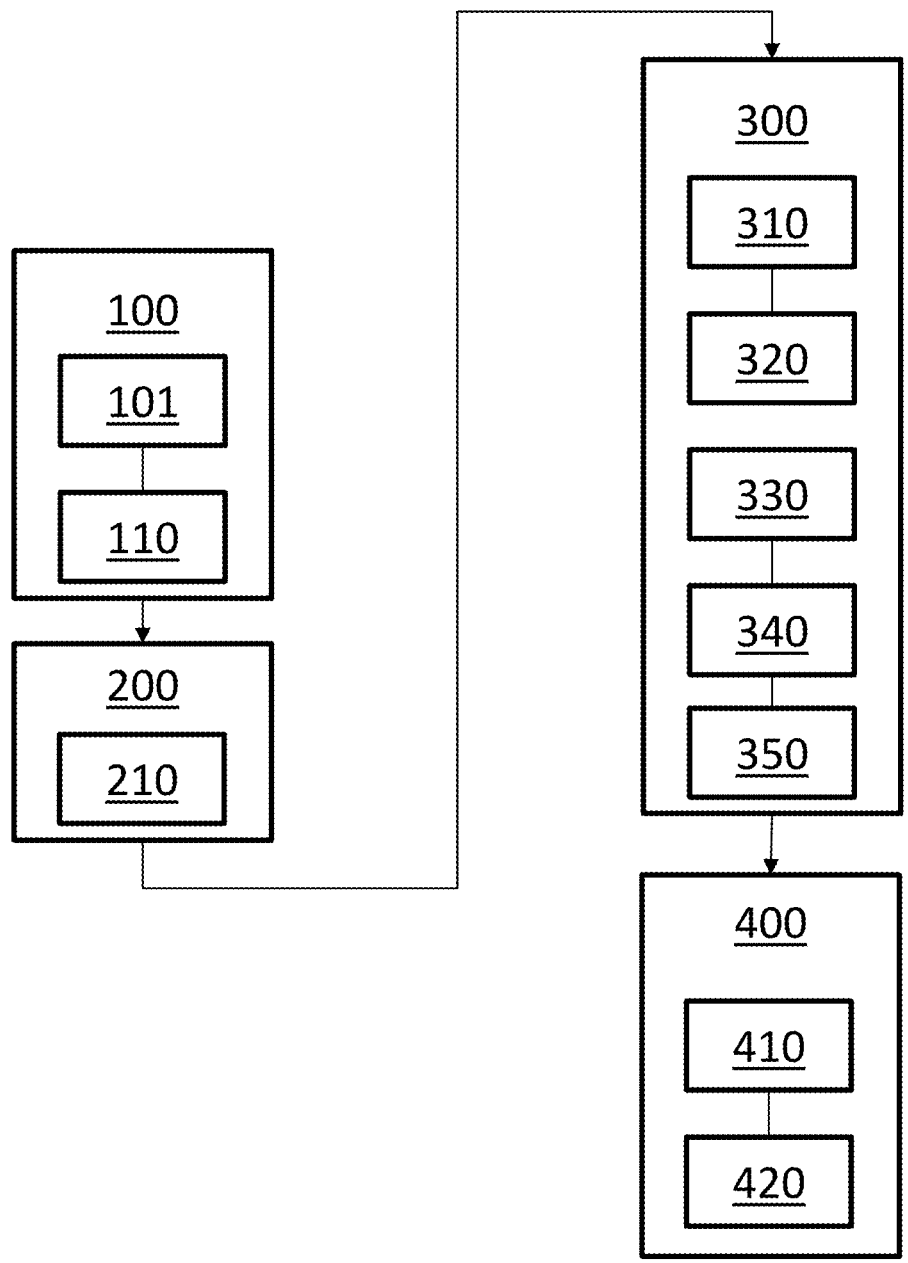
FIG. 1 shows the main steps of a method for selecting a cosmetic product according to an embodiment of the invention.
Figure 3:
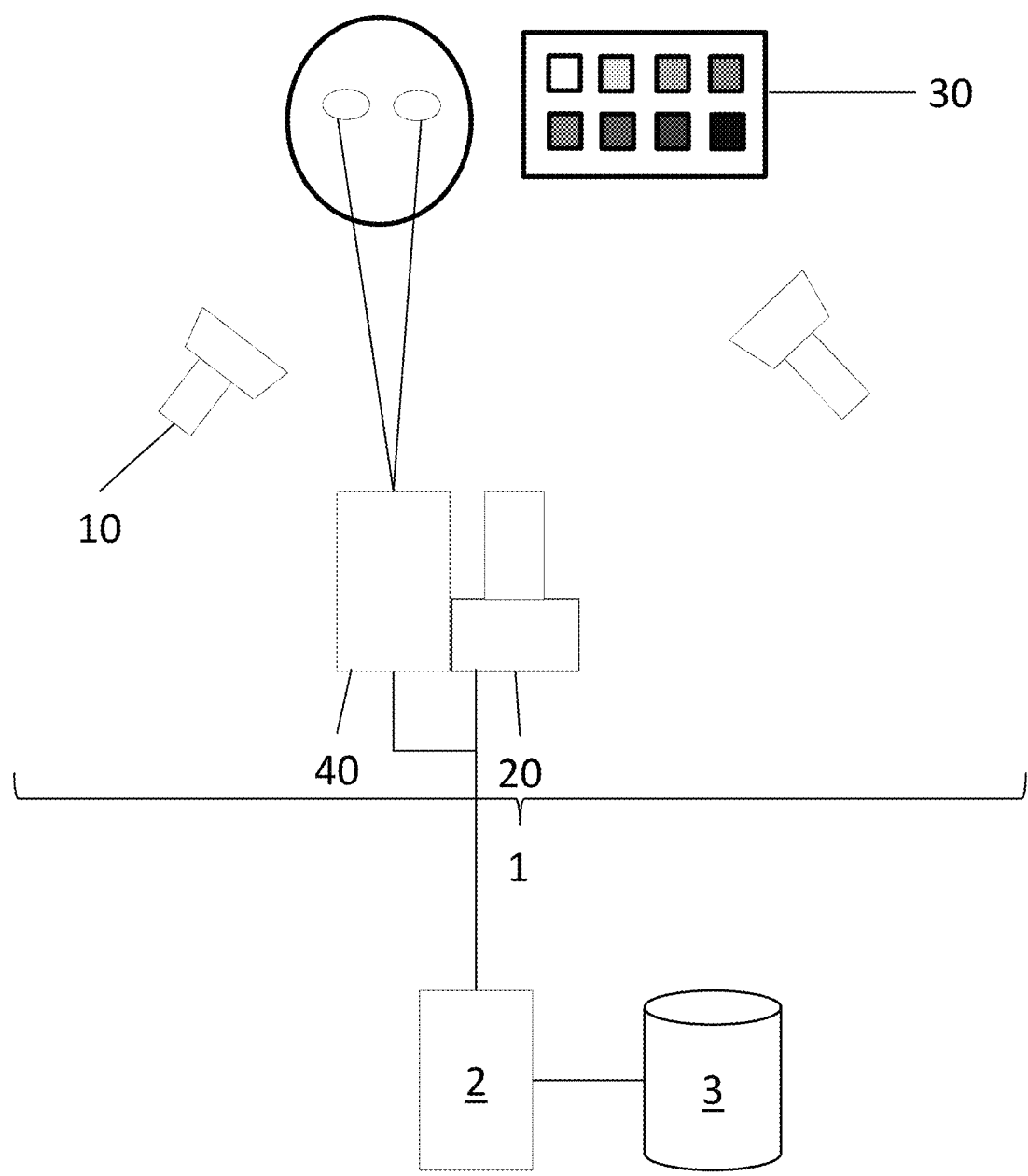

With reference to FIG. 1 a method for selecting a cosmetic product intended for a person will now be described. This method is implemented by a system shown schematically in FIG. 3 comprising a setup 1 for acquiring images in a controlled lighting environment, a computer 2 for processing the acquired images, and a memory 3 storing code instructions for performing the methods described above, when executed by the computer.

The memory also stores a database comprising information relating to a plurality of cosmetic products.

This selection method is particularly relevant in the context of a customer experience such as the following scenario.

A person (a customer) is greeted by a beauty consultant in order to be led through a beauty experience that begins with a series of questions intended to obtain a solid understanding of the customer's lifestyle and expectations. Next comes the skin tone measurement using the image acquisition method 100, in order to determine the absolute value of the customer's skin tone 200, then the determination 300 of the personalized color matrix. After these parameters are determined, a foundation recommendation is provided 400 to the customer based on both the colorimetric measurement and if necessary the customer preferences (more pinkish, golden, dark, or light).

The database used in the first step of the selection method comprises information relating to the plurality of cosmetic products contained in said database, such as an image of the product, its specifications sheet describing its component ingredients, its range of shades, its makeup effect (light, dark, golden, pinkish) (sheer, light, medium coverage). This database is enriched by addition of a usage color map which is obtained, for each cosmetic product of the database, by measuring the color of the cosmetic product under is condition of use.

The foundation recommendation 400 comprises, once a personalized color matrix is obtained for the individual, extracting 410 from the database the or each cosmetic product whose color measurement is part of the personalized color matrix, and using an information medium such as a paper document or a digital interface, presenting 420 to the person the product(s) comprised in the personalized color matrix. The person can then select its preferred product among those which belong to the personalized color matrix.

To determine the skin tone of a person, the invention makes use of a technology based on an imaging system. This makes it possible to avoid touching the person's face and to make a diagnosis for the whole face, taking into account color irregularities in the face. Finally, this choice of technique allows implementation with a wide range of image capture media, in particular using tools such as smartphones, tablets, or mirrors provided with an image capture device.

The selection method thus comprises a step of acquiring 100 an image of a person, comprising a step of capturing 110 an image of the person, said capture comprising a complete view of the person's face in a controlled lighting environment, and a step of processing 200 said image to determine the absolute value of the skin tone of the person, said processing step comprising analyzing 210 the colorimetric parameters $L_i$ and $h_i$, by means of digital processing, of each of some or all of the pixels of the face, the average of each of the $L_i$ and $h_i$ being used to determine the absolute value of the color of said face designated by $L_m$, $h_m$.

In addition to determining the parameters L and h, it is possible to obtain the distribution diagram ($D_L$) of the pixels of the image along the L axis between 0 and 100, and the distribution diagram ($D_h$) of the pixels of the image along the h axis between −15° and 105°.

This method thus allows an accurate, reliable, repeatable, and reproducible measurement of a person's skin tone based on a captured image. Several technical parameters must be taken into account to ensure the reproducibility and accuracy of the measurement of the variation.

In fact, the lighting environment is controlled by the use of a setup for acquiring images 1 comprising:

a standardized light source 10 able to provide a uniform lighting environment around the person who is the subject of the image acquisition, said light source being positioned wholly or partly facing the person;

an image capture device 20, comprising a lens, placed at a distance of between 20 cm and 50 cm, or at a distance of between 25 cm and 35 cm, from the person's face;

an image calibration device 30 such as a test pattern, said pattern being captured in an image in the same controlled lighting environment and at the same distance from the lens as the person's face;

optionally, a gaze tracking device 40 that makes it possible to control, during image capture, the actual distance of the person's face from the image capture device.

The standardized light source 10 may be chosen, for example, from light sources according to the D65, D55, D50 reference system, and preferentially will be chosen according to the D65 reference system. This light source will have at least one point facing the person's face but may be distributed in different orientations around the person's face. The light source must thus be arranged to allow uniform illumination of the face. For the purposes of the invention, the term "uniform" means the absence of any shadowed area on the face, in other words the absence of an area which is illuminated differently within the face.

The image acquisition method 100 thus comprises a test pattern calibration step 101, which is now described more precisely.

A test pattern containing patches of skin colors (N in number) is created so as to cover all skin tones around the world, from the lightest (large L) to the darkest (small L) and from the most pink (small h) to the most yellow (large h) and so as to have a more or less identical L in each row and a more or less identical h in each column.

The test pattern is photographed under the same lighting conditions and at the same distance from the camera as the person. The colorimetric data (lightness L and hue angle H) of the N patches of this pattern, measured with the image acquisition system, analyzed by digital processing, and averaged over all the pixels of each patch, are denoted by the values Lpn and hpn (n varying from 1 to N).

The colorimetric data for the N patches of this pattern (lightness and hue angle), also previously measured by means of a spectrophotometer under standardized lighting conditions that are identical or almost identical to those used in the imaging method, are denoted by the quantities Lsn and hsn (n varying from 1 to N).

A transformation matrix is computed from the colorimetric data (Lpn, hpn, Lsn, and hsn) resulting from the image capture and the spectrophotometer measurement and, by applying it to all pixels of the image, allows "replacing" in the color space of the spectrophotometer all the colorimetric data measured in the image. And thus one can place the absolute value of the person's skin tone in the same usage color map as the one in which the cosmetic products are represented.

One embodiment for making use of its means may for example be described as follows:

1/ Lighted frames enabling the reproduction of natural and standardized daylight (D65) with a good color rendering index and limiting shadows on the face have been developed are selected. This lighting make it possible to illuminate the face in a manner which predominates over the lighting environment of the point of sale without being too aggressive and annoying for the person.

2/ The distance of the person's face from the camera has a strong impact on color, particularly in terms of lightness of the face (the closer the person, the lighter they are) and camera settings such as ISO, white balance, exposure time have a direct impact on color in images. Automatic adjustment means for the camera, well known to those skilled in the art, are used at the beginning—particularly so that the face is neither overexposed nor underexposed—and then remain fixed throughout the experience. Distance verification may also be carried out by using a gaze tracking means.

3/ Some areas of the face (forehead, cheeks . . . ) are automatically detected by biometrics and the customer has the possibility of modifying these areas (enlarging, shrinking) or even eliminating them if there are disparities on his or her face that the customer does not wish to take into account in the analysis.

4/ Finally, the image is calibrated using a test pattern so as to obtain in the image the "true" colors that one would perceive in D65 lighting conditions. A matrix that is calculated from the known colorimetric values of the test pattern patches (measured by spectrophotometer) and the colorimetric values actually measured in the image captured by the image capture device, makes this calibration possible.

The selection method also comprises means for processing the image obtained during the image capture, comprising a step 200 of determining the absolute value of the person's skin tone, a step 900 of measuring the color of the plurality of cosmetic products under conditions of use and under standardized lighting conditions in order to obtain a usage color map, and a step of correlating the absolute value of the person's skin tone with the usage color map in order to determine 300 a personalized color matrix.

Figure 2:
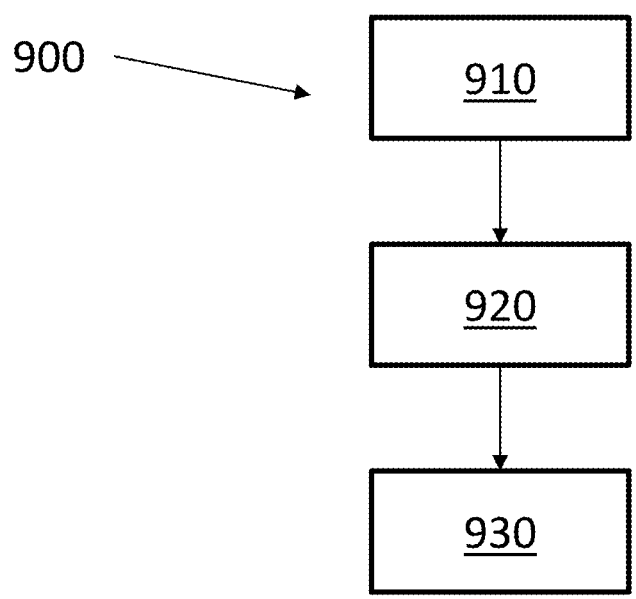
FIG. 2 schematically shows the main steps of a method of determining a usage color map of a cosmetic product according to an embodiment of the invention, FIG. 3 schematically shows a setup to provide a controlled lighting environment used in the acquisition of an image of a person or in the establishment of a cosmetic product color map.

More specifically, the measurement step 900 for determining the usage color map is carried out according to a method shown schematically in FIG. 2, comprising:

a step of spreading 910, as a homogeneous film of constant thickness, each of the plurality of cosmetic products on a reference medium;

a step of drying 920 each resulting film at a temperature between 20° C. and 45° C.;

a step of measuring 930 the colorimetric parameters $L_f$ and $h_f$ of each film obtained in the preceding step, by means of a spectrophotometer and under standardized D65 lighting conditions identical or almost identical to those used in the image acquisition method;

each pair of points $L_f/h_f$ representing the usage color map of each of the plurality of cosmetic products and the set of pairs of points $L_f/h_f$ forming, without restricting, the color space of the usage map.

The reference medium may be any material. It should preferably be flat and without roughness so that it does not interfere with spreading the film of the measured cosmetic product.

Once the absolute value of the person's skin tone and the usage color map of each of the cosmetic products are determined, it is necessary to correlate them to one another in order to be able to establish which cosmetic product has the greatest similarities to the person's skin tone under conditions of use, taking personal preferences into account where appropriate.

The correlation 300 of the absolute value of the person's skin tone with the usage color map comprises the following steps:

positioning 310 the values $L_m$ and $h_m$ of the absolute value of the person's skin tone within the color space of the usage color map defined by the set of $L_f/h_f$ pairs;

selecting 320 the $L_f/h_f$ pairs for which the $\Delta L$ absolute difference between $L_m$ and each $L_f$ is equal to ±10, and preferably ±5, and the $\Delta h$ absolute difference between $h_m$ and each $h_f$ is between 0° and 90°, and preferably between 0° and 50°, and more preferably between 0° and 20°, determining 330 the person's personalized color matrix that is within the color space in the L and h coordinates resulting from the previous selection step.

and possibly the following additional steps:

a step 340 of integrating the person's preferred personal criterion/criteria, for example such as a desired makeup effect, more or less coverage, a dewy or matte effect, a natural or layered effect, a choice of facial area not to be taken into account in the measurement of facial colorimetric data, a color rendering; and/or taking 350 distribution diagrams ($D_L$) or ($D_h$) into account in order to eliminate areas of dispersion in the variations of L and h of the different pixels, particularly in the case where the person's face has imperfections or irregularities in the color of the face.

Thus, by means of the method for selecting a cosmetic product as described in the invention, it is possible to offer a person a cosmetic product and preferably a foundation that is as close as possible to the person's skin tone or a foundation that is slightly more pink (smaller h), golden (larger h), lighter (larger L), or darker (smaller L) according to his or her preferences, by means of the questionnaire given by the beauty consultant at the beginning of the customer experience and whose answers can be directly implemented in the application in order to provide the recommendation.

Finally, it should be noted that the inventors chose to work in a 2D color space rather than 3D, taking into account the lightness L and the hue angle h for reasons of simplification but also because it has been observed that the saturation (C) has less influence than L and h for foundation color ranges, and can be ignored.

In addition to the method for selecting a cosmetic product, the invention comprises a method for determining an absolute value of a person's skin tone comprising the following steps:
- a step of capturing 100 an image of the person, said capture comprising a complete view of the person's face in a controlled lighting environment using:
  - a standardized light source 10 able to provide a uniform lighting environment around the person who is the subject of the image acquisition, said light source being positioned wholly or partly facing the person;
  - an image capture device 20, comprising a lens, placed at a distance of between 20 cm and 50 cm, or at a distance of between 25 cm and 35 cm, from the person's face;
  - an image calibration device 30 such as a test pattern, said pattern being captured in an image in the same controlled lighting environment and at the same distance from the lens as that of the person's face;
  - optionally a gaze tracking device 40 that makes it possible to control, during image capture, the actual distance of the person's face from the image capture device, and
- a step of analyzing 200 the colorimetric parameters $L_i$ and $h_i$, by means of digital processing, of each of some or all of the pixels of the face, the average of each of the $L_i$ and $h_i$ being used to determine the absolute value of the color of said face designated by $L_m$ and $h_m$.

The invention lastly comprises an image processing method characterized in that it comprises:
- a step of determining the absolute value of the person's skin tone,
- a step of measuring the color of the plurality of cosmetic products under conditions of use and under standardized lighting conditions in order to obtain a usage color map, and
- a step of correlating the absolute value of the person's skin tone with the usage color map in order to determine a personalized color matrix;

said correlating step comprising steps for:
- positioning the values $L_m$ and $h_m$ of the absolute value of the person's skin tone within the color space of the usage color map defined by the set of $L_f/h_f$ pairs;
- selecting the $L_f/h_f$ pairs for which the ΔL absolute difference between $L_m$ and each $L_f$ is equal to ±10, and preferably ±5, and the Δh absolute difference between $h_m$ and each $h_f$ is between 0° and 90°, and preferably between 0° and 50°, and more preferably between 0° and 20°,
- determining the person's personalized color matrix corresponding to the color space in the L and h coordinates resulting from the previous selection step.

The invention claimed is:

1. A method for selecting a cosmetic product intended for a person, the method comprising:
   acquiring an image of a person in a controlled lighting environment, and measuring and recording colorimetric coordinates of part or all of a face of the person, the acquiring the image of the person comprising capturing the image of the person by capturing a complete view of a face of the person in the controlled lighting environment that is controlled by
   a standardized light source configured to provide a uniform lighting environment around the person who is the subject of image acquisition, said standardized light source being positioned wholly or partly facing the person,
   an image capture device comprising a lens, placed at a distance of between 20 cm and 50 cm from the face of the person, and
   an image calibration device that is a test pattern captured in another image in the controlled lighting environment and at a same distance from the lens as the face of the person;
   processing said image by a standardized system in order to determine an absolute value of a skin tone of said person, the processing the image comprising analyzing colorimetric parameters $L_i$ and $h_i$ by digital processing each of some or all of pixels of the face, and using the average of each of the colorimetric parameters $L_i$ and $h_i$ to determine the absolute value of the color of said face designated by values $L_m$ and $h_m$, the analyzing the colorimetric parameters $L_i$ and $h_i$ comprising
      obtaining a distribution diagram $D_L$ of the pixels of the image along the L axis between 0 and 100 and a distribution diagram $D_h$ of the pixels of the image along the h axis between −15° and 105°;
   correlating said absolute value of the skin tone of said person with a usage color map established for each of a plurality of cosmetic products of a database by measuring a color of each cosmetic product under conditions of use, to determine a personalized color matrix;
   extracting, from said database, one or more of the cosmetic products having a color measurement that is part of the personalized color matrix; and
   using an information medium selected among a paper document and a digital interface, presenting to the person the one or more products comprised in the personalized color matrix.

2. The method of selecting according to claim 1, wherein the lens is placed at a distance of between 25 cm and 35 cm, from the face of the person.

3. The method of selecting according to claim 2, wherein the lighting environment is further controlled by a gaze tracking device configured to control, during image capture, the actual distance of the face of the person from the image capture device.

4. The method of selecting according to claim 1, wherein the usage color map is obtained for each cosmetic product by
   spreading a homogeneous film of constant thickness of the cosmetic product on a reference medium,
   drying each resulting film at a temperature between 20° C. and 45° C., and
   measuring the colorimetric parameters $L_f$ and $h_f$ of each dried resulting film by a spectrophotometer and under standardized lighting conditions identical or almost identical to lighting conditions used in the acquiring the image of the person, and
   wherein the correlating the absolute value of the skin tone of the person with the usage color map comprises:
      positioning values $L_m$ and $h_m$ of the absolute value of the skin tone of the person within a color space of the usage color map defined by a set of $L_f/h_f$ pairs measured for each cosmetic product,
      selecting the $L_f/h_f$ pairs for which the ΔL absolute difference between Lm and each Lf is equal to ±10, and the Δh absolute difference between hm and each hf is between 0° and 90°, and determining the personalized color matrix of the person that is within the color space in the L and h coordinates resulting from the selecting.

5. The method of selecting according to claim 1, wherein the correlating further comprises:
   integrating at least one of a personal preference criteria of the person, among a group consisting of:
   a desired makeup effect,
   more or less coverage,
   a dewy or matte effect,
   a natural or layered effect,
   a choice of facial area not to be taken into account in the measurement of facial colorimetric data, and
   a color rendering, and
   taking one or more of the distribution diagrams $D_L$ and $D_h$ into account in order to eliminate areas of dispersion in variations of L and h of the different pixels.

6. A method for determining an absolute value of a skin tone of a person, the method comprising:
   capturing an image of the person by capturing a complete view of a face of the person in a controlled lighting environment;
   analyzing colorimetric parameters $L_i$ and $h_i$, by digital processing, each of some or all of pixels of the face, and using the average of each of the colorimetric parameters $L_i$ and $h_i$ to determine the absolute value of the color of said face designated by values $L_m$ and $h_m$, and
   obtaining a distribution diagram $D_L$ of the pixels of the image along the L axis between 0 and 100 and a distribution diagram $D_h$ of the pixels of the image along the h axis between $-15°$ and $105°$,
   wherein the capturing the image of the person is performed using:
   a standardized light source configured to provide a uniform lighting environment around the person who is the subject of image acquisition, said standardized light source being positioned wholly or partly facing the person,
   an image capture device comprising a lens, placed at a distance of between 20 cm and 50 cm from the face of the person, and
   an image calibration device that is a test pattern captured in another image in the controlled lighting environment and at a same distance from the lens as the face of the person.

7. The method according to claim 6, wherein
   the lens is placed at a distance of between 25 cm and 35 cm, from the face of the person and.

8. An image processing method, the method comprising:
   determining the absolute value of a skin tone of the person;
   measuring a color of the plurality of cosmetic products under conditions of use and under standardized lighting conditions in order to obtain a usage color map; and
   correlating the absolute value of the skin tone of the person with the usage color map in order to determine a personalized color matrix by
   positioning values $L_m$ and $h_m$ of the absolute value of the skin tone of the person within a color space of the usage color map defined by a set of $L_f/h_f$ pairs,
   selecting the $L_f/h_f$ pairs for which a $\Delta L$ absolute difference between $L_m$ and each $L_f$ is equal to $\pm 10$, and an $\Delta h$ absolute difference between $h_m$ and each $h_f$ is between $0°$ and $90°$, and
   determining the personalized color matrix corresponding to the color space in the L and h coordinates resulting from the selecting.

9. The method according to claim 8, wherein
   the $\Delta L$ absolute difference between $L_m$ and each $L^f$ is equal to $\pm 5$.

10. The method of selecting according to claim 4, wherein the $\Delta L$ absolute difference between $L_m$ and each $L_f$ is equal to $\pm 5$.

11. The method of selecting according to claim 4, wherein the $\Delta h$ absolute difference between $h_m$ and each $h_f$ is between $0°$ and $50°$.

12. The method of selecting according to claim 11, wherein the $\Delta h$ absolute difference between $h_m$ and each $h_f$ is between $0°$ and $20°$.

13. The method of selecting according to claim 7, wherein the $\Delta h$ absolute difference between $h_m$ and each $h_f$ is between $0°$ and $50°$.

14. The method of selecting according to claim 13, wherein the $\Delta h$ absolute difference between $h_m$ and each $h_f$ is between $0°$ and $20°$.

* * * * *